United States Patent [19]
Kraus et al.

[11] Patent Number: 5,014,939
[45] Date of Patent: May 14, 1991

[54] HOLDING ELEMENT OF PLASTIC

[75] Inventors: Willibald Kraus, Grunstadt; Jürgen Hofmann, Eisenberg, both of Fed. Rep. of Germany

[73] Assignee: TRW United Carr GmbH & Co., Enkenbach-Alsenborn, Fed. Rep. of Germany

[21] Appl. No.: 437,167

[22] Filed: Nov. 16, 1989

[30] Foreign Application Priority Data

Oct. 5, 1989 [DE] Fed. Rep. of Germany ....... 3933305

[51] Int. Cl.⁵ .............................................. F16C 1/14
[52] U.S. Cl. ..................................... 248/70; 248/74.2
[58] Field of Search ................ 248/70, 71, 74.3, 74.5, 248/73, 74.2, 68.1

[56] References Cited
U.S. PATENT DOCUMENTS

| | | | |
|---|---|---|---|
| 225,237 | 3/1880 | Rober | 248/71 X |
| 489,083 | 1/1893 | Minnemeyer | 248/71 |
| 525,891 | 9/1894 | Fricke | 248/71 |
| 1,045,153 | 11/1912 | Kennedy | 248/70 |
| 4,771,743 | 9/1988 | McDowall | 174/72 A X |
| 4,805,479 | 2/1989 | Brightwell | 248/74.2 X |
| 4,865,280 | 9/1989 | Wollar | 248/71 X |

FOREIGN PATENT DOCUMENTS 2734753 2/1979 Fed. Rep. of Germany ..... 248/74.3

Primary Examiner—Alvin C. Chin-Shue
Attorney, Agent, or Firm—Fay, Sharpe, Beall, Fagan, Minnich & McKee

[57] ABSTRACT

The invention relates to a holding element 1 of plastic, with a holding zone 2 for holding at least one part, and a fastening zone 3 to be connected with a support. Between the fastening zone 3 and the support is arranged at least one intermediate element 5 which allows selective lateral height and/or angular compensation or adjustment for the holding zone.

5 Claims, 2 Drawing Sheets

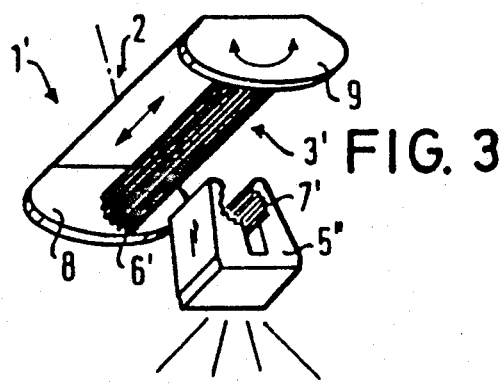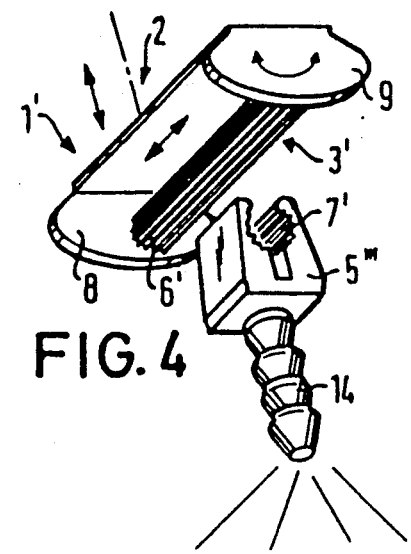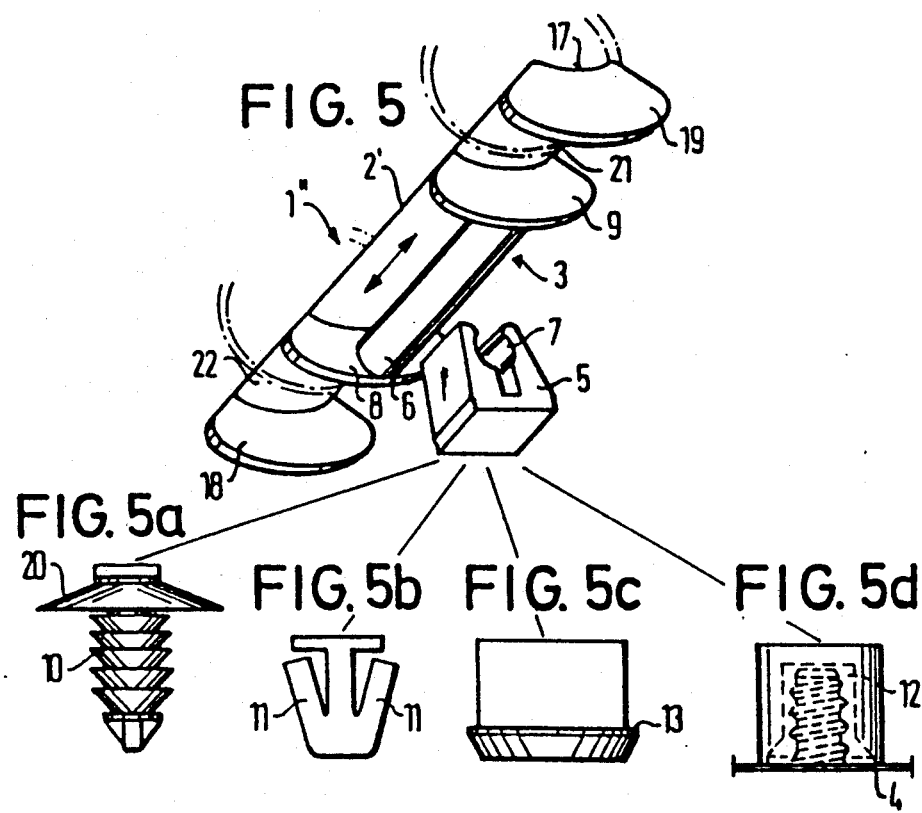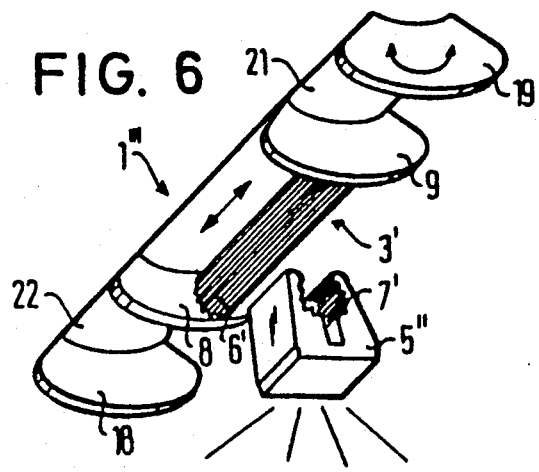

HOLDING ELEMENT OF PLASTIC

BACKGROUND OF THE INVENTION

The subject invention relates to a holding element formed of plastic and having a holding zone which holds an associated part, and further including a fastening zone for connection to a support.

As state of the art there is a known holding element designed, for example, for the holding of pipe or cable. In this known design, the holding zone partly encloses the pipe or cable and is then pressed by its associated fastening zone, into an opening in a support, see, for example, (U.S. Pat. No. 3,776,092, British Patent No. 3,213,500, or French Patent No. 1,401,899). A necessary condition for this type of fastening is that the openings in the support must be located and sized within a very narrow tolerance range when, for example, the location of the part to be held also allows for only a slight range of tolerance. With greater tolerances these prior constructions do not produce a perfect connection between the part to be held and the support.

Contrasted with this prior design, the present invention attacks the problem of designing a holding element of the kind mentioned so that, in a simple way, even rather great tolerances ranges may be covered.

BRIEF DESCRIPTION OF THE INVENTION

According to the invention, this problem is solved by the fact that between the fastening zone and the support there is arranged an intermediate element which allows for a compensation of the lateral positioning, the height and/or angle of the holding zone. Through this intermediate element the holding element is perfectly located and fastened to the support, even when large tolerance variations are present because of production problems.

In further development of the invention, the fastening zone may have a gripping zone wherein the length is greater than the width of the intermediate element. Through the dimensioning in the length of the gripping zone in relation to the width of the intermediate element, the holding element may be adjusted longitudinally so that greater tolerance variations can be tolerated. Preferably, the gripping zone is advantageously made like a rod and can be laid into an opening in the intermediate element. The opening in the intermediate element resiliently engages and surrounds the rod-like gripping zone. This allows the intermediate element to be snapped or clipped onto the rod-like gripping zone. The rod-like zone, in an alternative form of execution, may also be divided by several intermediate elements into individual sections to thereby assure a proper attaching with compensation for tolerance variations.

According to another feature of the invention, the engaging zone may be limited in its length by flanges in its end zones. Thus, it is assured that when in use the holding element does not slide out of the intermediate element.

According to another feature of the invention, the rod-like engaging portions of the fastening zone and the opening of the intermediate element are, in each case, provided with inter-engaging teeth. In this way, it is advantageously possible to angularly adjust the holding element on the support. Through the cooperating teeth of the engaging zone and the opening, a secure holding in the desired position of rotation is always assured and vibration is prevented.

According to another feature of the invention, the intermediate element may be connected with the support through use of a profiled element, resilient locking arms or through other conventional connecting means. As an alternative, it is also possible for the intermediate element to have a profiled pin that can be adjusted and locked as to height in a profiled opening of a second intermediate element which is connected with the support. In this way, it is possible to arrange the holding element to be height adjustable in relation to the support. Thus the holding element can be fastened to the support in a manner so that it is adjustable in height, as well as angularly and laterally. By this, a wider tolerance range compension is obtained by the construction according to the invention.

If pipes or cables are to be held, the holding zone of the holding element may have an opening which is concave or bowed in the lengthwise direction. The lengthwise opening of the holding zone advantageously runs parallel to the rod-like engaging zone of the fastening zone. To hold the pipe or cable securely against the holding element, it is possible according to, another embodiment of the invention, to arrange at a distance from the flange limiting the engagement zone, another flange in the engagement zone. In this case, the flanges lie below the arched lengthwise shape of the holding zone so that, for example, the pipe or cable to be held can be fastened securely by use of band or strap elements positioned in the zone between the flanges. After this fastening, the pre-mounted unit can be placed in the desired support opening. By the special shaping of the holding element of the invention, as explained above, a very wide tolerance range is covered.

BRIEF DESCRIPTION OF THE DRAWINGS

The invention is described in detail below, in conjunction with the embodiments shown in the drawings wherein:

FIGS. 3 and 4 are perspective showings of two other possibilities of execution of the holding element;

FIG. 5 is a perspective showing of another form of execution of the holding element of the invention designed for holding pipe or cable and with different possibilities of connection to a support illustrated in a to d; and, FIG. 6 is a perspective showing of another variant of the holding element of the invention intended for fastening of pipe or cable.

DETAILED DESCRIPTION OF THE PREFERRED AND ALTERNATE EMBODIMENTS

Figure 1:
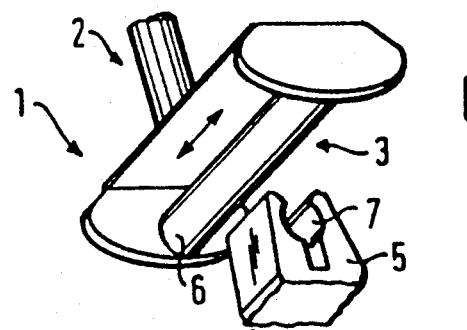
FIG. 1 is a perspective view of a holding element with different possibilities of fastening to a support illustrated in a to d.

Referring more particularly to the drawings where in the showings are for the purpose of illustrating preferred embodiments of the invention only, FIG. 1 shows a holding element 1 of plastic having a holding zone 2, for example, a bolt or stud (shown diagrammatically), and a fastening zone 3 to be connected with a support 4. This fastening zone 3 has a rod-like member 6 which defines an engaging or gripping area.

Between the support 4 and the rod-like member 6 there is connected an intermediate element 5 which has an offset opening 7 that receives the rod-like member 6. The opening 7 is defined by two resilient legs which resiliently grip around the rod-like member 6.

The fastening zone 3, in this embodiment the rod-like engaging zone 6, has a length which is greater than the width of the element 5. Thus, it is possible for the holding element 1 of the invention to be selectively adjusted in the arrow direction so that a sidewise or lateral tolerance compensation is produced. In a possible modification not shown in detail, the rod-like member 6 may also be divided into several sections by intermediate elements, by which a corresponding tolerance compensation and a suitable locating are assured.

Figure 1A:
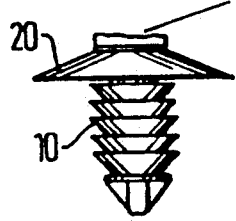

The intermediate element 5 may be provided in the lower zone with, for example, with a profiled element 10, for example a profiled bolt, which can be caught into a corresponding opening of a support 4. In the upper zone, a sealing lip 20 may be provided to cover the corresponding support opening (see FIG. 1a).

Figure 1B:

According to FIG. 1b, it is also possible for the intermediate element 5 to have in its lower zone, two resilient arms 11 which run oblique to each other. These resilient arms can engage behind a support opening to thus hold the holding element 1 through the intermediate element 5 to the support opening.

Figure 1C:

According to FIG. 1c, it is possible for the intermediate element 5 to have a circumferential catch ring 13, which can be positioned into two or three catch hooks (not shown in detail), of a separate part fastened to the support 4.

Figure 1D:
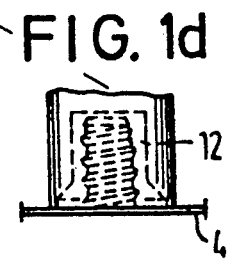

According to FIG. 1d, it is also possible for the intermediate element 5 to have an inner opening 12 which, after mounting catches around a profile bolt (not shown in detail) fastened to the support 4.

Through the construction shown in FIG. 1, a sidewise or lateral compensation is assured through the length of the rod-like member 6 which defines the engaging zone. According to FIG. 2, it is also possible to provide for a height compensation of the holding element. In this case, the intermediate element 5' has a profiled bolt 14 which can be inserted into a correspondingly profiled opening of a second intermediate element 16. The profiled element 16 can have, similar to the embodiments of FIGS. 1a to 1d, either a profiled element 10, resilient tongues 11, a catch ring 13 or an opening 12. According to how deep the profiled bolt 14 is inserted into the profiled opening 15 of the second intermediate element 16, the holding element 1 can be adjusted not only sidewise but also in height in the opening of a support 4. These two directions are indicated in FIG. 2 by the arrows in the zone of the holding element 1.

According to FIG. 3, it is possible for the rod-like member 6' which forms the fastening zone 3', to be designed with one or more teeth. The opening 7' of the intermediate element 5'' can also be designed with corresponding teeth. Thus, the holding element 1' can be adjusted for tolerance compensation sidewise and, also, according to the other arrow, an angular adjustability is given by the cooperation of the toothed engaging zone 6' and the toothed opening 7'.

Figure 2:
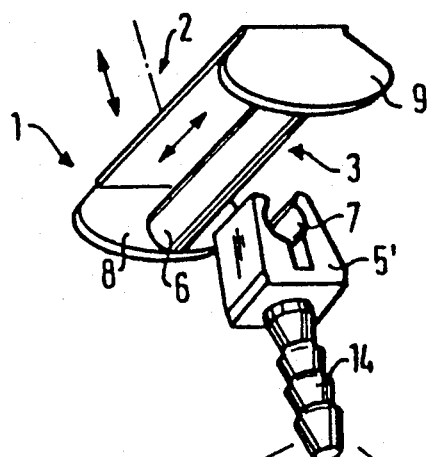
FIG. 2 is a perspective view which shows another possibility of execution of the holding element of the invention also shown with different possibilities, fastening to a support illustrated in a to d.
Figure 2A:
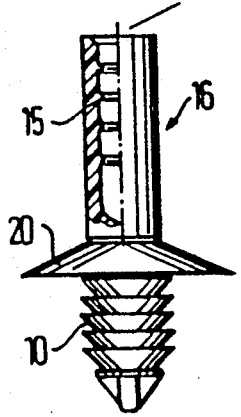
Figure 2B:
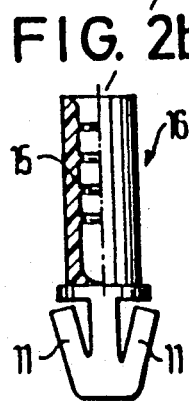
Figure 2C:
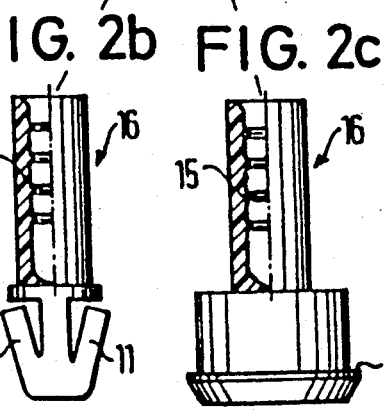
Figure 2D:
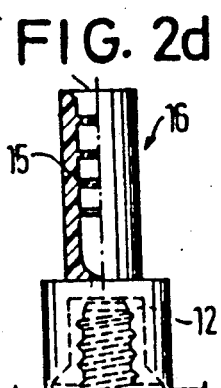

According to FIG. 4, it is also possible, similar to the embodiment illustrated in FIG. 2, to provide the intermediate element 5''' with a profiled bolt 14, which, as in the fastening possibilities of 2a, b, c, and d, can be fastened through an intermediate element 16 to a support 4. Here, there is given an ability to compensate for tolerance variations laterally, angularly and in height.

It is common to all the above described embodiments of FIG. 1 to FIG. 4, that the engagement zone 6 or 6' is limited in its end zones by flanges 8 and 9, respectively. Thus, it is assured that the openings 7 or 7' of the intermediate element lie against the inner sides of the flanges 8 and 9, respectively.

The holding element of the invention may be advantageously used for the holding of pipes or cables. In such case, the holding element 1'', according to FIG. 5, has in the holding zone 2'' an arched or lengthwise concave opening 17 into which pipe or cable can be laid. In order to hold these pipes or cables, they are wrapped or wound in the zones 21 and 22 by band elements (not shown in detail) and thus fastened to the holding element 1''.

In the FIG. 6 showing, the zones 21 and 22 are limited by the above-mentioned flanges 8 and 9, and by other flanges 18 and 19. The flanges 8 and 9 have here a double function; namely, on the one hand the limiting of the lengthwise displacement of the intermediate element 5, and on the other, the limiting of the band (not shown in detail) in the zones 21 and 22

After the pipes or cables (not shown in detail) are fastened through the use of band or strap elements in the zone 21 and 22, the pre-mounted assembly, with the holding element 1'', can be clipped into the intermediate element 5', which, in turn, is already fastened into a corresponding opening of a support 4. For this purpose, as in the embodiment illustrated in FIGS. 1a to 1d, are used either profiled elements 10, resilient fingers 11, catch rings 13 or openings 12, as shown in FIGS. 5a to 5d. Through this form of execution, it is possible, for the holding element to be pushed along axially, as shown by the arrow, within the length of the rod-like member 6 so long as the intermediate element 5 is not stopped by its end surface engaging against the inner side of the flange 8 or 9.

In the embodiment shown in FIG. 6, the rod-like member 6' may be provided with teeth which cooperate with corresponding teeth formed in the opening 7' of the intermediate element 5'. In this way, as in FIG. 3, a compensation of tolerance is given both sidewise and angularly as shown by the arrows.

If a height adjustment is to be also effected, it is also possible, as shown in FIG. 4, to provide the intermediate element 5''' with a profiled pin 14 which, as in FIGS. 2a to 2d, is to be fastened through an intermediate element 16 to a support 4. With this, the corresponding holding element 1''' can be fastened and adjusted sidewise angularly and in height at a fixed point of a support; that is, at a corresponding opening of the support 4.

Through the invention, it is possible for the holding zone 2 or 2' of a holding element 1, 1', 1'', 1''' to be made functionally secure and properly located relative to an opening of a support, even when great tolerance variations are present which must be compensated. Thus, there is present, in a simple way, a tolerance compensation in height, angularity and lateral position.

What is claimed is:

1. A holding assembly formed of plastic connecting and holding cable, pipe, or similar elongated elements to a subjacent support surface, said assembly comprising:

a fastening element having means for permitting it to be connected to a subjacent support surface;

a holding element for connection to the cable, pipe, or similar element to be held; and, connecting means joining said fastening element to said holding element, said connecting means including an elongated rod-like member having a longitudinal axis and resilient members defining an opening which resiliently grip around the rod-like member while permitting the rod-like member to be selectively moved longitudinally of its axis or rotated about its axis to thereby permit said holding element to be selectively positioned relative to said fastening element, said connecting means further including an intermediate element positioned between said fastening element and said holding element, said intermediate element being connected to said fastening element by an elongated member which is resiliently gripped by a socket to allow selective adjustment in the spacing between said fastening element and said holding element.

2. The holding assembly as defined in claim 1 wherein the rod-like member and said resilient members have interengaging teeth.

3. The holding assembly as defined in claim 1 wherein the holding element includes a concave surface for engaging and supporting cylindrical members.

4. The holding assembly as defined in claim 3 wherein the concave surface extends parallel to the rod-like member.

5. The holding assembly as defined in claim 1 wherein said intermediate element carries said elongated member and wherein said fastening element includes said socket which receives said elongated member.

* * * * *